United States Patent
Giordano et al.

(10) Patent No.: US 9,686,173 B1
(45) Date of Patent: Jun. 20, 2017

(54) UNSUPERVISED METHODOLOGY TO UNVEIL CONTENT DELIVERY NETWORK STRUCTURES

(71) Applicant: Narus, Inc., Sunnyvale, CA (US)

(72) Inventors: Danilo Giordano, Turin (IT); Stefano Traverso, Fossano (IT); Marco Mellia, Turin (IT); Luigi Grimaudo, Trapani (IT); Elena Baralis, Turin (IT); Alok Tongaonkar, San Jose, CA (US); Sabyasachi Saha, Sunnyvale, CA (US); Antonio Nucci, San Jose, CA (US)

(73) Assignee: Narus, Inc., Sunnyvale, CA (US)

( * ) Notice: Subject to any disclaimer, the term of this patent is extended or adjusted under 35 U.S.C. 154(b) by 242 days.

(21) Appl. No.: 14/524,566

(22) Filed: Oct. 27, 2014

(51) Int. Cl.
G06F 15/173 (2006.01)
H04L 12/26 (2006.01)
H04L 29/06 (2006.01)

(52) U.S. Cl.
CPC .......... H04L 43/0876 (2013.01); H04L 67/42 (2013.01)

(58) Field of Classification Search
USPC ................................ 709/223, 224, 231, 250
See application file for complete search history.

(56) References Cited

PUBLICATIONS

Yan, H., et al., "Argus: End to end service anomaly detection and localization from an isp's point of view". IEEE INFOCOM 2012.
Munoz, G., et al., "Traffic anomaly detection using k-means clustering". GI/ITG Workshop MMBnet 2007.
Torres, R. D., et al., "Inferring undesirable behavior from p2p traffic analysis". ACM SIGMET-RICS 2009.
Goldberg, M.K., et al., "Measuring similarity between sets of overlapping clusters". IEEE SocialCom 2010.
Kalnis, P., et al., "On discovering moving clusters in spatio-temporal data". In Advances in spatial and temporal databases, pp. 364-381, Springer 2005.

Primary Examiner — Lan-Dai T Truong
(74) Attorney, Agent, or Firm — Kwan & Olynick LLP

(57) ABSTRACT

A method for analyzing a content delivery network. The method includes obtaining network traffic flows corresponding to user nodes accessing contents from a set of servers of the content delivery network, extracting a timing attribute from each network traffic flow associated with a server, where the timing attribute is aggregated into a timing attribute dataset of the server based on all network traffic flows associated with the server, generating a statistical measure of the timing attribute dataset as a portion of a feature vector representing the server, where the feature vector is aggregated into a set of feature vectors representing the set of servers, analyzing the set of feature vectors based on a clustering algorithm to generate a set of clusters, and generating, based on the set of clusters, a representation of server groups in the content delivery network.

20 Claims, 6 Drawing Sheets

UNSUPERVISED METHODOLOGY TO UNVEIL CONTENT DELIVERY NETWORK STRUCTURES

BACKGROUND OF THE INVENTION

A content delivery network or content distribution network (CDN) is a large distributed system of servers deployed in multiple facilities (e.g., data centers) across the Internet. The goal of a CDN is to serve content to end users with high availability and high performance. CDNs serve a large fraction of the Internet content today, including web objects (text, graphics and scripts), downloadable objects (media files, software, documents), applications (e-commerce, portals), live streaming media, on-demand streaming media, and social networks.

YouTube® relies on a massive and globally distributed CDN to stream the billions of videos in its catalogue. Unfortunately, there is very little or no information published about the design and internals of this CDN. This combined with the pervasiveness of YouTube® poses a big challenge for Internet Service Providers (ISPs), which are compelled to constantly optimize end-users' Quality of Experience (QoE) without having any control on the characteristics of the CDN.

SUMMARY

In general, in one aspect, the present invention relates to a method for analyzing a content delivery network. The method includes obtaining a plurality of network traffic flows corresponding to a plurality of user nodes accessing contents from a plurality of servers of the content delivery network, wherein the content delivery network comprises a plurality of server groups each comprising a portion of the plurality of servers, extracting, by a computer processor and from the plurality of network traffic flows, a timing attribute from each network traffic flow associated with a server of the plurality of servers, wherein the timing attribute is aggregated into a timing attribute dataset of the server based on all network traffic flows associated with the server in the plurality of network traffic flows, generating, by the computer processor and based on a pre-determined statistical algorithm, a statistical measure of the timing attribute dataset as a portion of a feature vector representing the server, wherein the feature vector is aggregated into a plurality of feature vectors representing the plurality of servers, analyzing, by the computer processor and based on a pre-determined clustering algorithm, the plurality of feature vectors to generate a plurality of clusters, and generating, based on the plurality of clusters, a representation of the plurality of server groups.

In general, in one aspect, the present invention relates to a system for analyzing a content delivery network. The system includes a processor and memory, an acquisition module comprising instructions stored in the memory, when executed on the processor having functionality to obtain a plurality of network traffic flows corresponding to a plurality of user nodes accessing contents from a plurality of servers of the content delivery network, wherein the content delivery network comprises a plurality of server groups each comprising a portion of the plurality of servers, a feature extractor comprising instructions stored in the memory, when executed on the processor having functionality to extract, from the plurality of network traffic flows, a timing attribute from each network traffic flow associated with a server of the plurality of servers, wherein the timing attribute is aggregated into a timing attribute dataset of the server based on all network traffic flows associated with the server in the plurality of network traffic flows, and generate, based on a pre-determined statistical algorithm, a statistical measure of the timing attribute dataset as a portion of a feature vector representing the server, wherein the feature vector is aggregated into a plurality of feature vectors representing the plurality of servers, a feature space analyzer comprising instructions stored in the memory, when executed on the processor having functionality to analyze, based on a pre-determined clustering algorithm, the plurality of feature vectors to generate a plurality of clusters, and generate, based on the plurality of clusters, a representation of the plurality of server groups, and a repository for storing the plurality of feature vectors and the plurality of clusters.

In general, in one aspect, the present invention relates to a non-transitory computer readable medium embodying instructions for analyzing a content delivery network. The instructions when executed by a processor include functionality for obtaining a plurality of network traffic flows corresponding to a plurality of user nodes accessing contents from a plurality of servers of the content delivery network, wherein the content delivery network comprises a plurality of server groups each comprising a portion of the plurality of servers, extracting, from the plurality of network traffic flows, a timing attribute from each network traffic flow associated with a server of the plurality of servers, wherein the timing attribute is aggregated into a timing attribute dataset of the server based on all network traffic flows associated with the server in the plurality of network traffic flows, generating, based on a pre-determined statistical algorithm, a statistical measure of the timing attribute dataset as a portion of a feature vector representing the server, wherein the feature vector is aggregated into a plurality of feature vectors representing the plurality of servers, analyzing, based on a pre-determined clustering algorithm, the plurality of feature vectors to generate a plurality of clusters, and generating, based on the plurality of clusters, a representation of the plurality of server groups.

Other aspects and advantages of the invention will be apparent from the following description and the appended claims.

DETAILED DESCRIPTION

Figure 1:
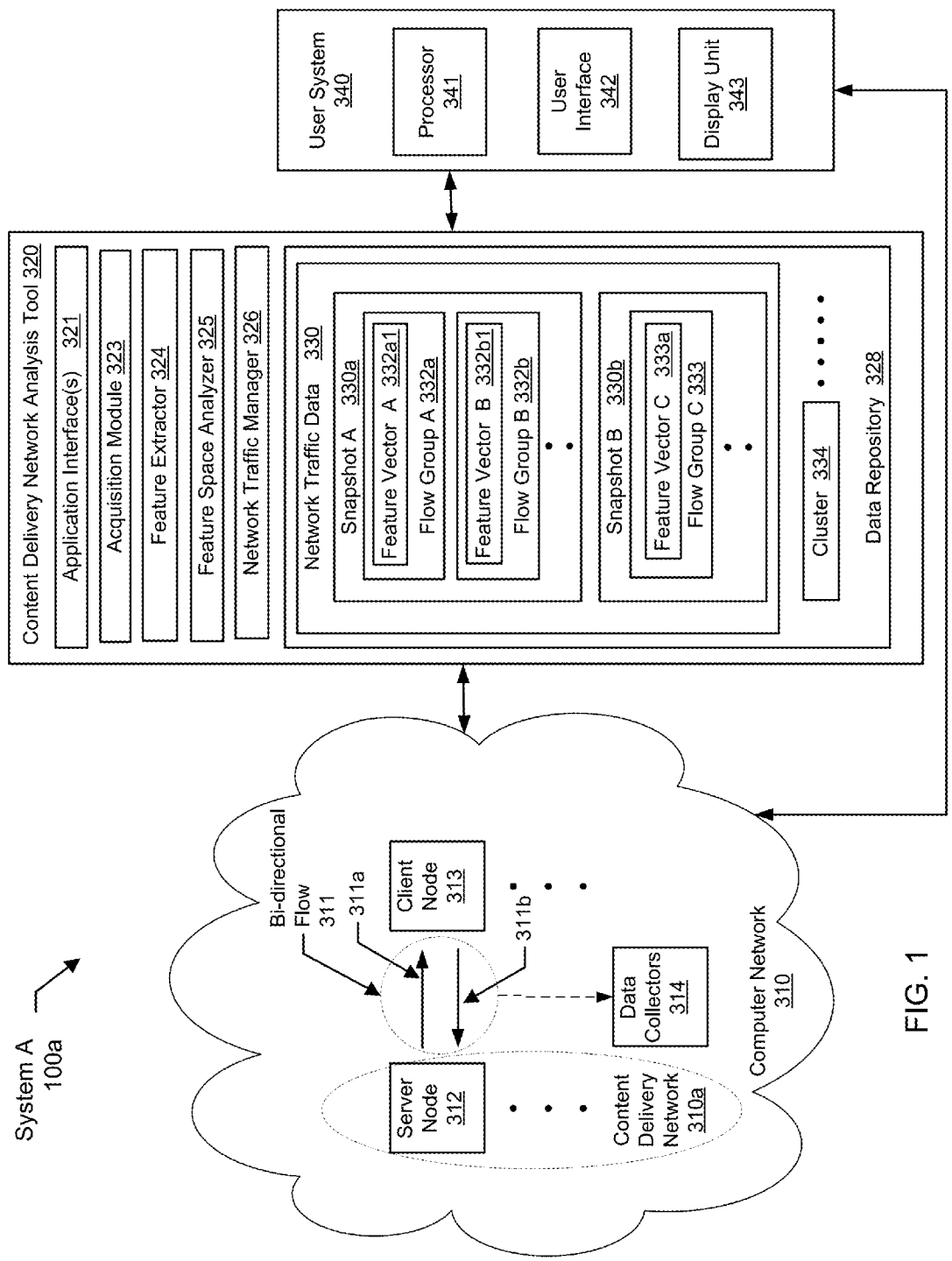
FIG. 1 shows a schematic block diagram according to aspects of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. In other instances, well-known features have not been described in detail to avoid obscuring the invention.

Generally, a flow (e.g., a TCP flow) between two network hosts (e.g., a client and a server in a client-server application scenario) is a series of data records (referred to as packets or data packets, e.g., Internet Protocol (IP) packets) regarding the communication between the two network hosts engaged in an Internet transaction. The Internet transaction may be related to completing a task, which may be legitimate or malicious. Each packet includes a block of data (i.e., actual packet content referred to as payload) and supplemental data (referred to as header) containing information regarding the payload. Each flow is referred to as attached to each of the two hosts and is uniquely defined by a 5-tuple identifier (i.e., source address, destination address, source port, destination port, and transport protocol). Specifically, each packet in a flow includes, in its header, the 5-tuple identifier of the flow and sequence information identifying a logical position of the packet in the flow. Said in other words, a flow consists of one or more packets having the same 5-tuple identifier, aggregate based on sequence information contained in the headers of the packets, and transmitted within a defined time window. Typically, a user command to execute an application initiates a flow from an application client (i.e., source address=client IP) to an application server (i.e., destination address=server IP), which is preceded by DNS flows (i.e., DNS query and DNS response) between the client IP and a DNS server to identify the server IP based on a domain name contained in the user command. Termination (or completion) of the flow may be marked by a Transmission Control Protocol (TCP) packet flag (e.g., "connection reset" or "fin") or if a time-out condition occurs when no more packet having the 5-tuple identifier is transmitted in the sequence beyond a pre-determined time-out period since the last transmitted packet in the flow. This time-out period may be heuristically determined by the application and is generally set at 2 min.

Throughout this disclosure, the terms "traffic flow," "data flow," "flow," "traffic stream," and "stream" are used interchangeably and may refer to a uni-directional flow, a bi-directional flow, a complete flow or any portion thereof unless explicitly stated otherwise. For example, a bi-directional flow may include a client-to-server uni-directional flow and a server-to-client uni-directional flow that are identifiable based on the flow header information. Further, the term "transport protocol" refers to a protocol associated with or based on top of a transport layer of a computer network. For example, the transport protocol may be referred to as layer-four (L4) protocol with respect to the OSI model (i.e., Open Systems Interconnection Reference Model of the network architecture). Examples of layer-four protocols include TCP, UDP, etc.

Further still, the term "application" or "network application" refers to an application associated with or based on top of an application layer of a computer network. For example, the network application may be referred to as layer-seven application with respect to the OSI model. Examples of layer-seven applications includes HTTP (HyperText Transfer Protocol), SMTP (Simple Mail Transfer Protocol), IRC (Internet relay chat), FTP (File Transfer Protocol), BitTorrent® (a registered trademark of BitTorrent, Inc., San Francisco Calif.), GTALK® (a registered trademark of Google, Inc., Mountain View, Calif.), MSN® (a registered trademark of Microsoft Corporation, Redmond, Wash., etc.). Layer-seven applications may also be referred to as layer-seven protocols.

Packet capture is the act of capturing data packets crossing a network. Partial packet capture may be performed to record headers without recording the total content of corresponding payloads. Deep packet capture may be performed to capture complete network packets including each packet header and complete packet payload. Once packets in a flow, or a portion thereof, are captured and stored, deep packet inspection may be performed to review network packet data, perform forensics analysis to uncover the root cause of network problems, identify security threats, and ensure data communications and network usage complies with outlined policy.

The disclosed method and system start with elementary units of communication activity. In a possible embodiment, such units may be flows of packets, where a flow is here (and commonly) defined as a set of packets that belong to the same communication. For example, in networks based on the TCP/IP protocol suite, such as the Internet, the packets belonging to the same flow may be identified as having the same source IP address, destination IP address, transport layer protocol (e.g., TCP or UDP), source port and destination port.

In the context of computer networks, time to live (TTL) is a mechanism that limits the lifespan or lifetime of data in a computer or network. TTL may be implemented as a counter or timestamp attached to or embedded in the data. Once the prescribed event count or time span has elapsed, data is discarded. In computer networking, TTL prevents a data packet from circulating indefinitely. Under the Internet Protocol, TTL is an 8-bit field. In the IPv4 header, TTL is the 9th octet of 20. In the IPv6 header, it is the 8th octet of 40. The maximum TTL value is 255, the maximum value of a single octet. A recommended initial value is 64. The time to live value can be thought of as an upper bound on the time that an IP datagram can exist in an Internet system. The TTL field is set by the sender of the datagram, and reduced by every router on the route to its destination. If the TTL field reaches zero before the datagram arrives at its destination, then the datagram is discarded and an ICMP error datagram (11—Time Exceeded) is sent back to the sender. The purpose of the TTL field is to avoid a situation in which an undeliverable datagram keeps circulating on an Internet system, and such a system eventually becoming swamped by such "immortals".

In the context of computer networks, the round-trip time (RTT) is the length of time it takes for a data packet to be sent plus the length of time it takes for an acknowledgment of that signal to be received. The RTT is also known as the ping time. An internet user can determine the RTT by using the ping command Network links with both a high bandwidth and a high RTT can have a very large amount of data (the bandwidth-delay product) "in flight" at any given time. Such "long fat pipes" require a special protocol design. One example is the TCP window scale option.

FIG. 1 shows a system block diagram of a system A (100a) in accordance with one or more embodiments of the invention. Those skilled in the art, having the benefit of this detailed description, will appreciate the components shown in FIG. 1 may differ among embodiments of the invention, and that one or more of the components may be optional. Although specific numbers of components are shown in FIG. 1, different number of each component may be included. In one or more embodiments of the invention, one or more of the components shown in FIG. 1 may be omitted, repeated, supplemented, and/or otherwise modified from that shown in FIG. 1. Accordingly, the specific arrangement of components shown in FIG. 1 should not be construed as limiting the scope of the invention.

As shown in FIG. 1, the system A (100a) includes a content delivery network (CDN) analysis tool (320), a user system (340), and a computer network (310). The CDN analysis tool (320) includes a data repository (328), one or more application interfaces (321), an acquisition module (323), a feature extractor (324), a feature space analyzer (325), and a network traffic manager (326). The user system (340) includes a processor (341), a user interface (342), and a display unit (343). The computer network (310) may include wired and/or wireless portions of the Internet and/or other data communications networks such as wide area networks (WANs), local area networks (LANs), etc. Further, the computer network (310) includes network nodes (e.g., server node (312), client node (313), data collectors (314), etc.), which are devices configured with computing and communication capabilities for executing applications in the network (310). In one or more embodiments, multiple (typically a large number such as thousands, tens of thousands, etc.) servers form a content delivery network (CDN), such as the CDN (310a). For example, the server node (312) is part of the CDN (310a).

As shown in FIG. 1, the server node (312) and client node (313) communicate with each other by exchanging data packets forming a bi-directional flow (311), which includes two uni-directional flows (311a) and (311b) represented by two arrows. In one or more embodiments, the server node (312) and the client node (313) exchange data packets in the bi-directional flow (311) as a result of a network application executing on the server node (312) and the client node (313). In this context, the bi-directional flow (311) is referred to as being generated by the network application executing on the server node (312) and client node (313). For example, the source IP address in the 5-tuple of the uni-directional flow (311a) and the destination IP address in the 5-tuple of the unit-direction flow (311b) are both the IP address of the server node (312), referred to as the server IP address. The destination IP address in the 5-tuple of the uni-directional flow (311a) and the source IP address in the 5-tuple of the unit-direction flow (311b) are both the IP address of the client node (313), referred to as the client IP address. The source port in the 5-tuple of the uni-directional flow (311a) and the destination port in the 5-tuple of the unit-direction flow (311b) are both the port of the server node (312), referred to as the server port. The destination port in the 5-tuple of the uni-directional flow (311a) and the port in the 5-tuple of the unit-direction flow (311b) are both the port of the client node (313), referred to as the client port. Further, the server port and the transport protocol in both 5-tuples are characteristics of the application executing on the server node (312) and the client node (313). In one or more embodiments, the network application is a content delivery application allowing the client node (313) to access contents from servers (e.g., server node (312)) of the CDN (310a). For example, the server node (312) may be a video server streaming video contents (e.g., YouTube® video contents) to the client node (313), which may be a user device, such as a desktop computer, a notebook computer, a tablet computer, a smart phone, or other types of computing device. Throughout this disclosure, the terms "server" and "CDN server" may be used interchangeably depending on the context.

In one or more embodiments, certain device(s) (e.g., data collectors (314)) within the computer network (310) may be configured to collect the network data (e.g., bi-directional flow (311)) for providing to the CDN analysis tool (320). Each of these components is described below. One of ordinary skill in the art will appreciate that embodiments are not limited to the configuration shown in FIG. 1.

Figure 3A:
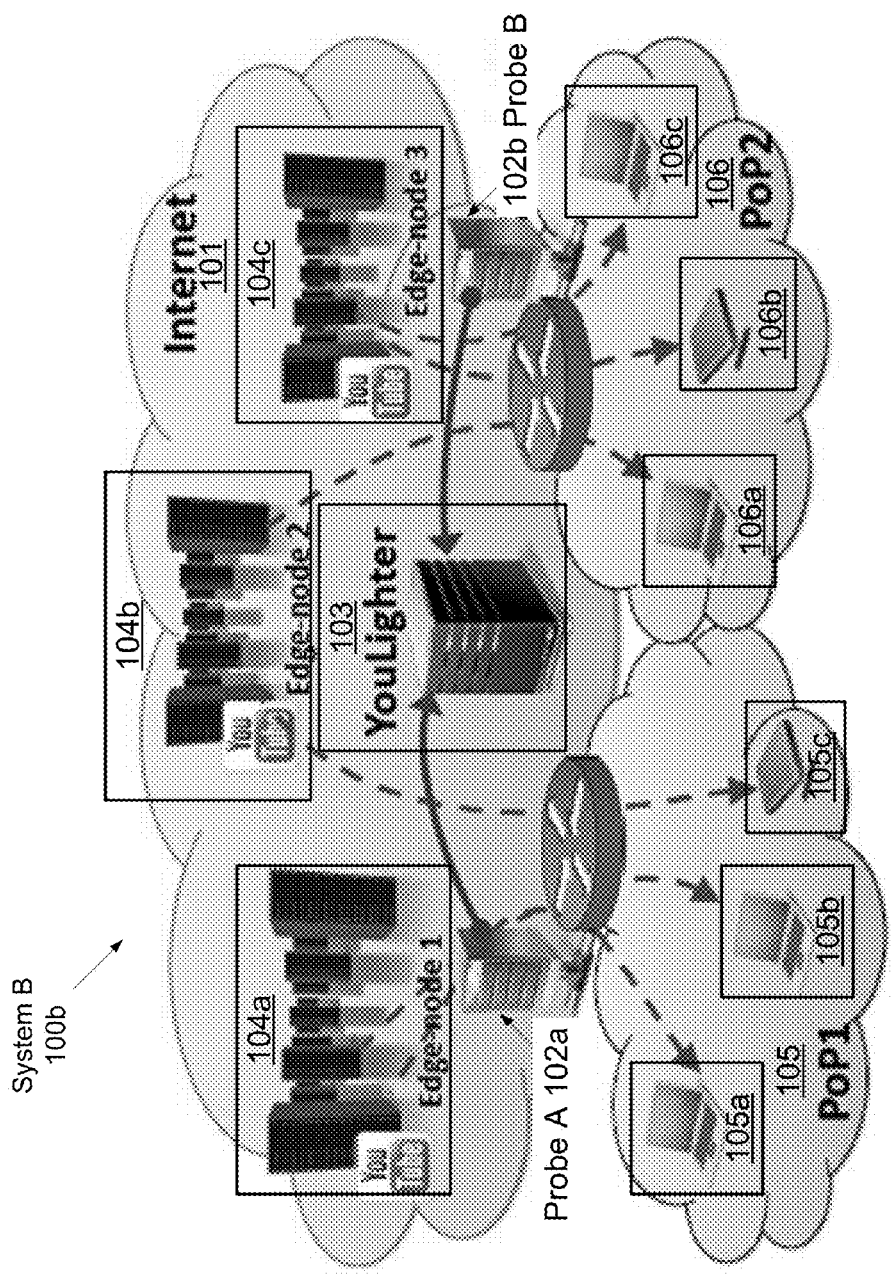
FIGS. 3A-3C show an example according to aspects of the invention.

An example of the system A (100a) with details of the computer network (310) is shown in FIG. 3A. Those skilled in the art, having the benefit of this detailed description, will appreciate the components shown in FIG. 3A may differ among embodiments of the invention, and that one or more of the components may be optional. Although specific numbers of components are shown in FIG. 3A, different number of each component may be included. In one or more embodiments of the invention, one or more of the components shown in FIG. 3A may be omitted, repeated, supplemented, and/or otherwise modified from that shown in FIG. 3A. Accordingly, the specific arrangement of components shown in FIG. 3A should not be construed as limiting the scope of the invention.

As shown in FIG. 3A, the system B (100b) includes the Internet (101) having data center facilities (referred to as edge-nodes, such as edge-node 1 (104a), edge-node 2 (104b), edge-node 3 (104c), etc.) and an analysis tool (referred to as YouLighter (103)), which is an example of the CDN analysis tool (320) shown in FIG. 1. Each edge-node may be a data center known to one skilled in the art that typically has a large number (e.g., hundreds, thousands, tens of thousands, etc.) of servers, which may be examples of the server node (312) shown in FIG. 1. In particular, the edge-node 1 (104a), edge-node 2 (104b), and edge-node 3 (104c) are part of a CDN, which is an example of the CDN (310a) shown in FIG. 1. Further, user nodes (105a, 105b, 105c, 106a, 106b, 106c), which may be examples of the client node (313) shown in FIG. 1, access the Internet (101) via Internet service providers' (ISPs') networks and are collectively referred to as Points-of-Presence (PoP), such as PoP 1 (105) and PoP 2 (106). In addition, data collectors (e.g., probe A (102a), probe B (102b)), which may be examples of the data collectors (314) shown in FIG. 1, capture network traffic flows from the CDN for providing to the analysis tool YouLighter (103) to be analyzed.

In the example shown in FIG. 3A, the CDN is operated by a application service provider (ASP) who does not disclose the characteristics of the CDN (e.g., configuration of the servers and data centers) to the ISPs. For example, the characteristics of the CDN includes total number and IP addresses of servers at each data center, the computing/storage capacity and loading of each server/data center, the allocation and/or load balancing policy of the servers/data centers, physical locations of the servers/data centers, etc. that are proprietary information of the ASP and not shared with the ISPs. Accordingly, the ISPs are not able to rely on any ASP provided CDN configuration information to optimize end-users' Quality of Experience (QoE) in using the user nodes (105a, 105b, 105c, 106a, 106b, 106c) to receive contents from the CDN. Instead, the analysis tool YouLighter (103) analyzes the network traffic flows captured from the CDN to generate an estimated representation of the CDN configuration for providing to the ISPs. In addition, the ISPs may receive an alert when the analysis tool YouLighter (103) detects a change in the CDN configuration based on its analysis result.

In one or more embodiments, the CDN is used to stream YouTube® video contents to the user nodes. Once a user has started the video playback, the video player starts executing on the user node to initiate a progressive download of the video content from a particular cache of the CDN. The particular cache is allocated from the CDN based on the CDN's allocation and/or load balancing policy, which specifies, for example whether any "preferred" group of caches is associated with any user node and whether such association is stable over time.

Generally, the cache-to-user-node path between two caches in the same edge-node and user nodes in the same PoP exhibits the same properties, e.g., same RTT. Conversely, the path toward two caches in different edge-nodes should present different RTT. In one or more embodiments, the YouLighter (103) analyzes content streaming traffic flows provided by the probe A (102a) and/or probe B (102b) based on timing parameters (e.g., RTT, TTL) extracted from these flows to unveil characteristics of the CDN.

Returning to the discussion of FIG. 1, in one or more embodiments of the invention, the CDN analysis tool (320) is configured to interact with the computer network (310) using one or more of the application interface(s) (321). The application interface (321) may be configured to receive data (e.g., bi-directional flow (311)) from the computer network (310) and/or store received data to the data repository (328). Such network data captured over a time period (e.g., an hour, a day, a week, etc.) is referred to as trace or network trace. Network trace contains network traffic data related to communications between nodes in the computer network (310). For example, the network trace may be captured on a routine basis using the data collectors (314) and selectively sent to the application interface (321) from time to time to be formatted and stored in the repository (327) for analysis. For example, the data collectors (314) may be a packet analyzer, network analyze, protocol analyzer, sniffer, netflow device, semantic traffic analyzer (STA), or other types of data collection devices that intercept and log data traffic passing over the computer network (310) or a portion thereof. In one or more embodiments, the data traffic log may include an extract of information found in traffic. For example, the data traffic log may include metadata or protocol information extracted from the packets, such as timing attributes (e.g., RTL, TTL). In a possible embodiment, packets are assembled in flows and/or application level sessions and higher level protocol information and payload is extracted and included in the data traffic log. In a possible embodiment, such extracted information is organized as a vector, where each extracted piece of data is one vector element. In one or more embodiments, the data collectors (314) may be deployed in the computer network (310) by a network communication service provider (e.g., ISP), a network security service provider, or other business or government entities. The data collector (314) may be configured to capture and provide network trace to the application interface (321) through an automated process, such as through a direct feed or some other form of automated process. Such network data may be captured and provided on a periodic basis (e.g., hourly, daily, weekly, etc.) or based on a trigger. For example, the trigger may be activated automatically in response to an event in the computer network (310) or activated manually through the user system (340). In one or more embodiments, the data collectors (314) are configured and/or activated by the CDN analysis tool (320).

In one or more embodiments, the user system (340) is configured to interact with an analyst user using the user interface (342). The user interface (342) may be configured to receive data and/or instruction(s) from the analyst user. The user interface (342) may also be configured to deliver information (e.g., a report or an alert) to the analyst user. In addition, the user interface (342) may be configured to send data and/or instruction(s) to, and receive data and/or information from, the CDN analysis tool (320). The analyst user may include, but is not limited to, an individual, a group, an organization, or some other entity having authority and/or responsibility to access the CDN analysis tool (320). Specifically, the context of the term "analyst user" here is distinct from that of a user (also referred to as an end user) of the computer network (310), the client node (313), and or the network application executing on the client node (313). The user system (340) may be, or may contain a form of, an internet-based communication device that is capable of communicating with the application interface (321) of the CDN analysis tool (320). Alternatively, the CDN analysis tool (320) may be part of the user system (340). The user system (340) may correspond to, but is not limited to, a workstation, a desktop computer, a laptop computer, or other user computing device.

In one or more embodiments, the processor (i.e., central processing unit (CPU)) (341) of the user system (340) is configured to execute instructions to operate the components of the user system (340) (e.g., the user interface (342) and the display unit (343)).

In one or more embodiments, the user system (340) may include a display unit (343). The display unit (343) may be a two dimensional (2D) or a three dimensional (3D) display configured to display information regarding the computer network (e.g., browsing captured network traffic data) or to display intermediate and/or final results of the CDN analysis tool (320) (e.g., report, alert, etc.).

As shown, communication links are provided between the CDN analysis tool (320), the computer network (310), and the user system (340). A variety of links may be provided to facilitate the flow of data through the system A (100a). For example, the communication links may provide for continuous, intermittent, one-way, two-way, and/or selective communication throughout the system A (100a). The communication links may be of any type, including but not limited to wired and wireless. In one or more embodiments, the CDN analysis tool (320), the user system (340), and the communication links may be part of the computer network (310).

In one or more embodiments, a central processing unit (CPU, not shown) of the CDN analysis tool (320) is configured to execute instructions to operate the components of the CDN analysis tool (320). In one or more embodiments, the memory (not shown) of the CDN analysis tool (320) is configured to store software instructions for performing the functionality of the CDN analysis tool (320). The memory may be one of a variety of memory devices, including but not limited to random access memory (RAM), read-only memory (ROM), cache memory, and flash memory. The memory may be further configured to serve as back-up storage for information stored in the data repository (328).

The CDN analysis tool (320) may include one or more system computers, which may be implemented as a server or any conventional computing system having a hardware processor. However, those skilled in the art will appreciate that implementations of various technologies described herein may be practiced in other computer system configurations, including hypertext transfer protocol (HTTP) servers, multiprocessor systems, microprocessor-based or programmable consumer electronics, hand-held devices, network personal computers, minicomputers, mainframe computers, and the like.

In one or more embodiments, the CDN analysis tool (320) is configured to obtain and store data in the data repository (328). In one or more embodiments, the data repository (328) is a persistent storage device (or set of devices) and is configured to receive data from the computer network (310) using the application interface (321). The data repository (328) is also configured to deliver working data to, and receive working data from, the acquisition module (323), feature extractor (324), feature space analyzer (325), and network traffic manager (326). The data repository (328) may be a data store (e.g., a database, a file system, one or more data structures configured in a memory, some other medium for storing data, or any suitable combination thereof), which may include information related to the network traffic classification. Such information may include network traffic data (e.g., network traffic data (330)) captured from the computer network (310) and derived server clusters (e.g., cluster (334)) for managing user network usage. The data repository (328) may be a device internal to the CDN analysis tool (320). Alternatively, the data repository (328) may be an external storage device operatively connected to the CDN analysis tool (320).

In one or more embodiments, the CDN analysis tool (320) is configured to interact with the user system (340) using the application interface (321). The application interface (321) may be configured to receive data and/or instruction(s) from the user system (340). The application interface (321) may also be configured to deliver information and/or instruction(s) to the user system (340). In one or more embodiments, the CDN analysis tool (320) is configured to support various data formats provided by the user system (340).

In one or more embodiments, the CDN analysis tool (320) includes the acquisition module (323) that is configured to obtain a network trace from the computer network (310), for example via data collectors (314). In one or more embodiments, the acquisition module (323) works in conjunction with the data collectors (314) to parse data packets and collate data packets belonging to the same flow tuple (i.e., the aforementioned 5-tuple) to form the network trace. For example, such network trace, or information extracted therefrom, may then be stored in the repository (327) as the network traffic data (330), etc. In one or more embodiments of the invention, the network traffic data (330) includes CDN content delivery traffic data. In one or more embodiments of the invention, the network traffic data (330) includes snapshots (i.e., snapshot A (330a), snapshot B (330b)) of network traffic flows that are active in the CDN (310a) during corresponding time windows of the snapshots. The term "snapshot" refers to a collection of flows captured during a particular time window. The flows in a snapshot are generated from multiple CDN servers in the CDN (310a). Flows generated by a single CDN server in the snapshot form a flow group. Each snapshot includes multiple flow groups corresponding to the CDN servers and is used for extracting features representing characteristics of the CDN servers during the corresponding time window. For example, the snapshot A (330a) includes the flow group A (332a1), flow group B (332b1), etc., while the snapshot B (330b) includes the flow group C (333), etc. The flow group A (332a1) includes flows associated with a particular CDN server (e.g., the server node (312)) that are active during the time window of the snapshot A (330a), while the flow group C (333) includes flows associated with the same CDN server (e.g., the server node (312)) that are active during the time window of the snapshot B (330b). Similarly, the flow group B (332b1) includes flows associated with another server (not shown) of the CDN (310a) that are active during the time window of the snapshot A (330a). In one or more embodiments of the invention, the time window of the snapshot A (330a) precedes the time window of the snapshot B (330b). In other words, the time window of the snapshot B (330b) is subsequent to the time window of the snapshot A (330a). In one or more embodiments, the time window of the snapshot A (330a) and the time window of the snapshot B (330b) are disjoint. In other words, the time window of the snapshot A (330a) ends prior to the time window of the snapshot B (330b) begins. In this manner, the CDN analysis tool (320) iteratively captures a sequence of snapshots of the CDN content delivery traffic data for extracting features of the CDN servers that represent evolution of characteristics of the CDN (310a).

In one or more embodiments, a flow parser (e.g., acquisition module (323) in conjunction with data collectors (314) in FIG. 1) reconstructs (e.g., eliminates redundant packets, collates packets into a correct sequence, etc.) all the packets that correspond to the same traffic flow (e.g., uni-directional flows (311a), (311b)) identified by the aforementioned 5-tuple. In one or more embodiments, the flows are captured and parsed throughout a pre-configured time interval recurring on a periodic basis (e.g., every minute, hourly, daily, etc.) or triggered in response to an event. Such pre-configured time interval correspond to the aforementioned time window of a snapshot in the network traffic data (330).

In one or more embodiments of the invention, the CDN analysis tool (320) includes the feature extractor (324) that is configured to extract features of the CDN servers. For example, the feature vector A (332a1), feature vector B (332b1), and feature vector C (333a) are extracted from the flow group A (332a), flow group B (332b), and the flow group C (333), respectively. In particular, the feature vector A (332a1) represents characteristics of the server node (312) during the time window of the snapshot A (330a), while the feature vector C (333a) represents characteristics of the server node (312) during a subsequent time window of the snapshot B (330b). Similarly, the feature vector B (332b1) represents characteristics of another CDN server (not shown) during the time window of the snapshot A (330a). In one or more embodiments, each feature vector includes a sequence of values of a timing attribute defined by a network traffic protocol of the network traffic data (330). For example, values of the timing attribute are extracted from the flow group A (332a) to form a statistical distribution, such as a histogram. Accordingly, the sequence of values correspond to a sequence of pre-determined percentiles of the statistical distribution. In one or more embodiments, the features of the CDN servers, such as the feature vector A (332a1), feature vector B (332b1), and feature vector C (333a), represent a characteristics of allocating the user nodes to the CDN servers in the CDN (310a). Examples of extract features of the CDN servers are described in reference to FIGS. 2 and 3B below.

In one or more embodiments of the invention, the CDN analysis tool (320) includes the feature space analyzer (325) that is configured to generate a hyperspace (i.e., a multi-dimensional space having more than three dimensions) to represent characteristics of the CDN (310a) based on the extracted features of the CDN servers. Specifically, the hyperspace has a cardinality greater then three and is defined based on the cardinality of the extracted feature vectors. In one or more embodiments, each CDN server is represented as a point in the hyperspace, and each data center is represented as a cluster of points in the hyperspace corresponding to the data center's servers. These points and point clusters form a hyper-map for each snapshot of the network traffic data (330) and represents characteristics of the CDN (310a) during the correspond time window of the snapshot.

In one or more embodiments, the feature space analyzer (325) is further configured to compute a hyper-distance to represent a difference between the hyper-map of the snapshot A (330a) and the subsequent hyper-map of the snapshot B (330b). Accordingly, the feature space analyzer (325) detects, based on the hyper-distance, a change in the CDN (310a), such as a change in the server configuration at each data center, the capacity and loading of each server/data center, the allocation and/or load balancing policy of the servers/data centers, physical locations of the servers/data centers, etc.

In one or more embodiments of the invention, the CDN analysis tool (320) includes the network traffic manager (326) to generate an alert based on the CDN change detected by the feature space analyzer (325). For example, the alert is sent to the analyst user of the user system (340) for providing to the ISPs. Accordingly, the ISPs may make appropriate adjustment based on the alert to optimize end-users' Quality of Experience (QoE).

Examples of generating the hyperspace and hyper-map to represent characteristics of the CDN (310a) based on the extracted features of the CDN servers are described in reference to FIGS. 2, 3B, and 3C below.

Figure 2:
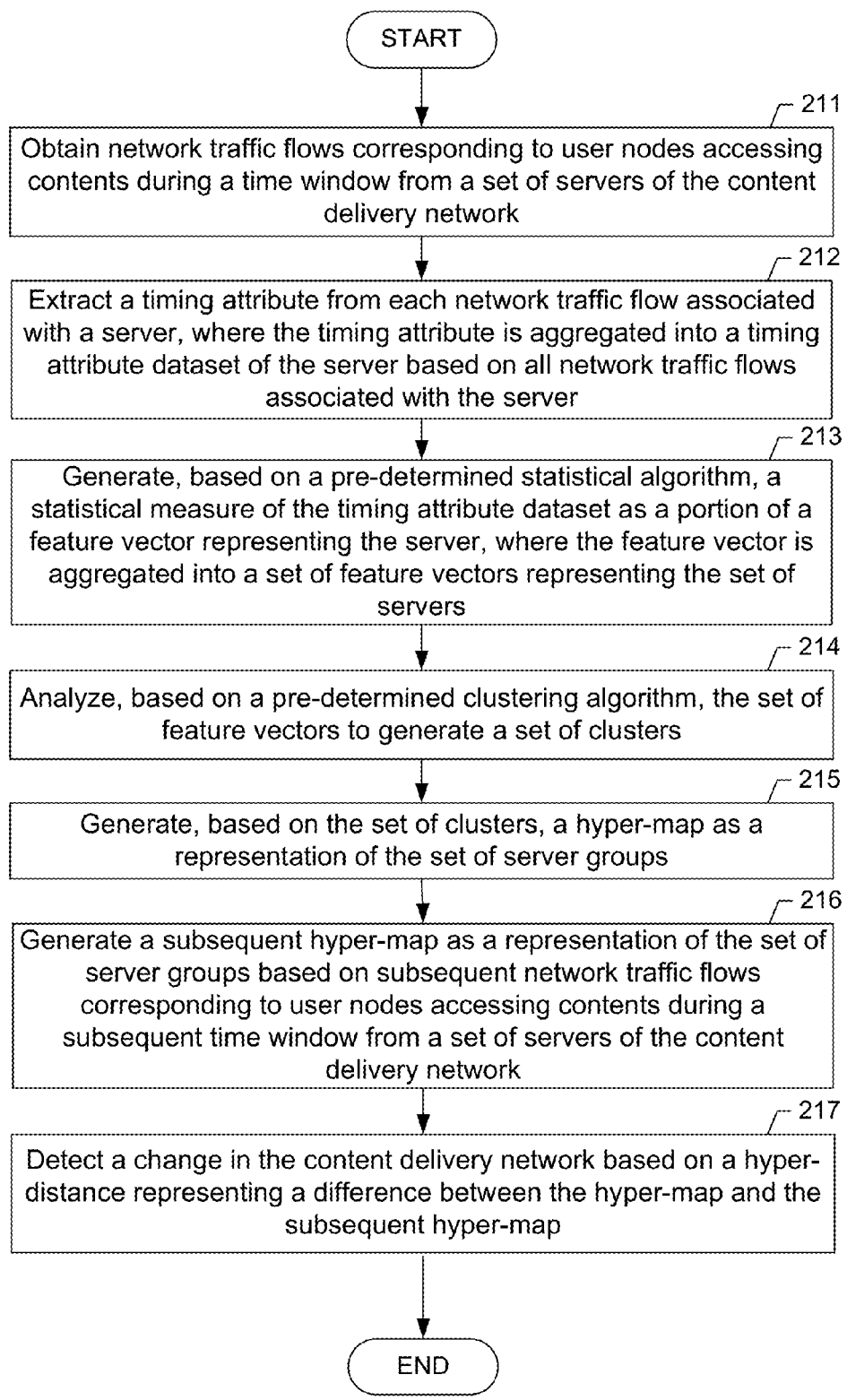
FIG. 2 shows a flowchart of a method according to aspects of the invention.

FIG. 2 depicts a flowchart of a method in accordance with one or more embodiments of the invention. In one or more embodiments of the invention, one or more of the steps shown in FIG. 2 may be omitted, repeated, and/or performed in a different order. Accordingly, embodiments of the invention should not be considered limited to the specific arrangements of steps shown in FIG. 2. In one or more embodiments of the invention, the method depicted in FIG. 2 may be practiced using system A (100a) and system B (100b) described with respect to FIGS. 1 and 3A.

Initially in Step 211, a snapshot of network traffic flows are obtained. In one or more embodiments, the snapshot includes network traffic flows that are active during a time window of a pre-determined time span. In particular, the snapshot corresponds to user nodes accessing contents from servers of a content delivery network (CDN) during the time window. Accordingly, the snapshot may be divided into flow groups where each flow group includes network traffic flows associated with one of the servers of the CDN. Generally, the servers are hosted in a large number of facilities (e.g., data centers) of the CDN throughout diverse geographic locations (e.g., a country, a continent, the world, etc.) where the user nodes also reside. In one or more embodiments, the characteristics of the CDN, such as the structural organization of the servers/data centers and allocation/load balancing policies of the servers/data centers are proprietary information of an application service provider (ASP) operating the CDN. For example, the servers of the CDN across a country, a continent, the world, etc. are allocated to stream contents to different users nodes throughout the same diverse geographic locations according to the CDN's allocation/load balancing policies of the servers/data centers. Such proprietary information is not disclosed to ISPs that provide Internet access, and therefore access to the CDN, to the user nodes.

In one or more embodiments, the Step 212 is performed using the acquisition module (323) described in reference to FIG. 1 above.

In Step 212, a timing attribute is extracted from each network traffic flow in each of the flow groups within the snapshot. In one or more embodiments, the timing attribute is stored in a data packet field defined by a protocol (e.g., Internet Protocol) of each network traffic flow. For example, the timing attribute may include TTL, which is an 8-bit field under the Internet Protocol. In the IPv4 header, TTL is the 9th octet of 20. In the IPv6 header, it is the 8th octet of 40. In another example, the timing attribute may include RTT, which is the round trip delay of SYN packet sent from a user node (i.e., client) to a server and SYN-ACK packet returned from the server to the user node. The RTT is measured every time a message is sent to the server from the user node. For example, the RTT may be measured using Tstat, which is a software routine that collects all the data samples from a probe (i.e., data collector) in the CDN and returns various RTT parameters such as minimum RTT, maximum RTT, average RTT, and standard deviation of RTT. In one or more embodiments, the minimum RTT is used as the timing attribute. Other RTT parameters may also be used. Further, other types of client-to-server round trip delay may be used as the timing attribute.

The extracted timing attribute values for all network traffic flows associated with a particular server are aggregated into a timing attribute dataset of the particular server. In one or more embodiments, the timing attribute includes one or more of a round trip time delay (RTT) parameter and a time to live (TLL) parameter.

In Step 213, a statistical measure of the timing attribute dataset is generated based on a pre-determined statistical algorithm. For example, the timing attribute dataset may be analyzed using the pre-determined statistical algorithm to generate a statistical distribution, such as a histogram, a percentile diagram, etc. The statistical measure is a parameter of the statistical distribution. In one or more embodiments, the statistical measure includes timing attribute values for a sequence of pre-determined percentiles, such as a first timing attribute value at the first pre-determined (e.g., 20th) percentile, a second timing attribute value at the second pre-determined (e.g., 35th) percentile, a third timing attribute value at the third pre-determined (e.g., 50th) percentile, a fourth timing attribute value at the fourth pre-determined (e.g., 65th) percentile, a fifth timing attribute value at the fifth pre-determined (e.g., 80th) percentile, etc. As an example, 20% of the entries in the timing attribute dataset have values less than the first timing attribute value. In one or more embodiments, the timing attribute values for the sequence of pre-determined percentiles are included in a feature vector representing the corresponding server. In other words, the feature vector of the server includes the first timing attribute value, the second timing attribute value, the third timing attribute value, the fourth timing attribute value, the fifth timing attribute value, etc. as the vector components.

In one or more embodiments, the feature vector is aggregated into a set of feature vectors representing the servers of the CDN. In one or more embodiments, each feature vector corresponds to a point in a hyperspace defined based on the cardinality of the feature vector. Accordingly, the set of feature vectors correspond to a large number of points in the hyperspace where each point represents one of the servers. In particular, the spatial distribution of the set of feature vectors in the hyperspace represents a characteristics of allocating user nodes to the servers in the CDN.

In one or more embodiments, Steps 212 and 213 are performed using the feature extractor (324) described in reference to FIG. 1 above.

In Step 214, the set of feature vectors are analyzed based on a pre-determined clustering algorithm to generate a set of clusters. In one or more embodiments, the clustering algorithm groups portions of the large number of points in the hyperspace into clusters based on a distance measure (e.g., the Euclidean distance) of the hyperspace. In one or more embodiments, each cluster corresponds to an approximation of a server group hosted in a facility of the CDN. In other words, the clusters correspond to the facilities of the CDN, and the points in each cluster correspond to the servers hosted in the corresponding facility of the CDN.

In Step 215, a representation of the server groups of the CDN is generated. In one or more embodiments, a point in the hyperspace is determined for each cluster to represent the corresponding cluster. For example, the point may be the centroid or a geometric center of the cluster. Accordingly, the clusters are represented by their centroids or geometric centers, thus forming a hyper-map to represent the server groups of the CDN.

In Step 216, a subsequent snapshot of network traffic flows are obtained. In one or more embodiments, the subsequent snapshot includes network traffic flows that are active during a subsequent time window of the pre-determined time span and subsequent to the time window of Step 211. Similar to the snapshot of Step 211, the subsequent snapshot corresponds to user nodes accessing contents from servers of the CDN during the subsequent time window.

In one or more embodiments, a subsequent set of points are determined, based on the pre-determined statistical algorithm and the pre-determined clustering algorithm, to form a subsequent hyper-map in the hyperspace representing the server groups of the CDN for the subsequent time window.

In Step 217, a hyper-distance is computed to represent a difference between the hyper-map and the subsequent hyper-map. In one or more embodiments, a change in the CDN is detected based on the hyper-distance. For example, if the hyper-distance exceeds a pre-determined threshold, it is determined that one or more characteristics of the CDN have changed/evolved in between the time window and the subsequent time window.

In one or more embodiments, Steps 214 through 217 are performed using the feature space analyzer (325) described in reference to FIG. 1 above.

Examples of the feature vector, the clusters, the hyperspace, the hyper-map, and the hyper-distance are described in reference to FIGS. 3B and 3C below.

Figure 3B:
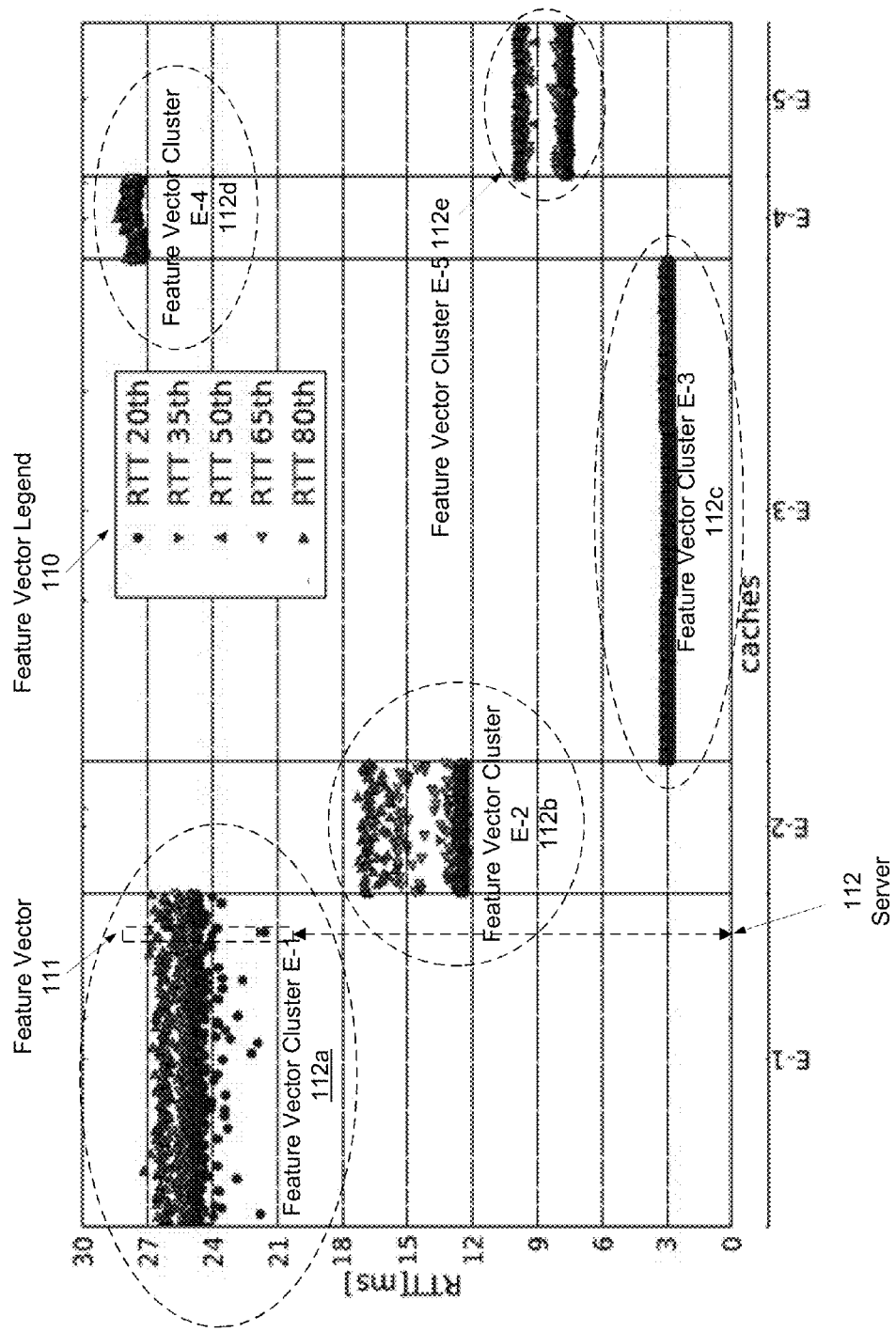
Figure 3C:
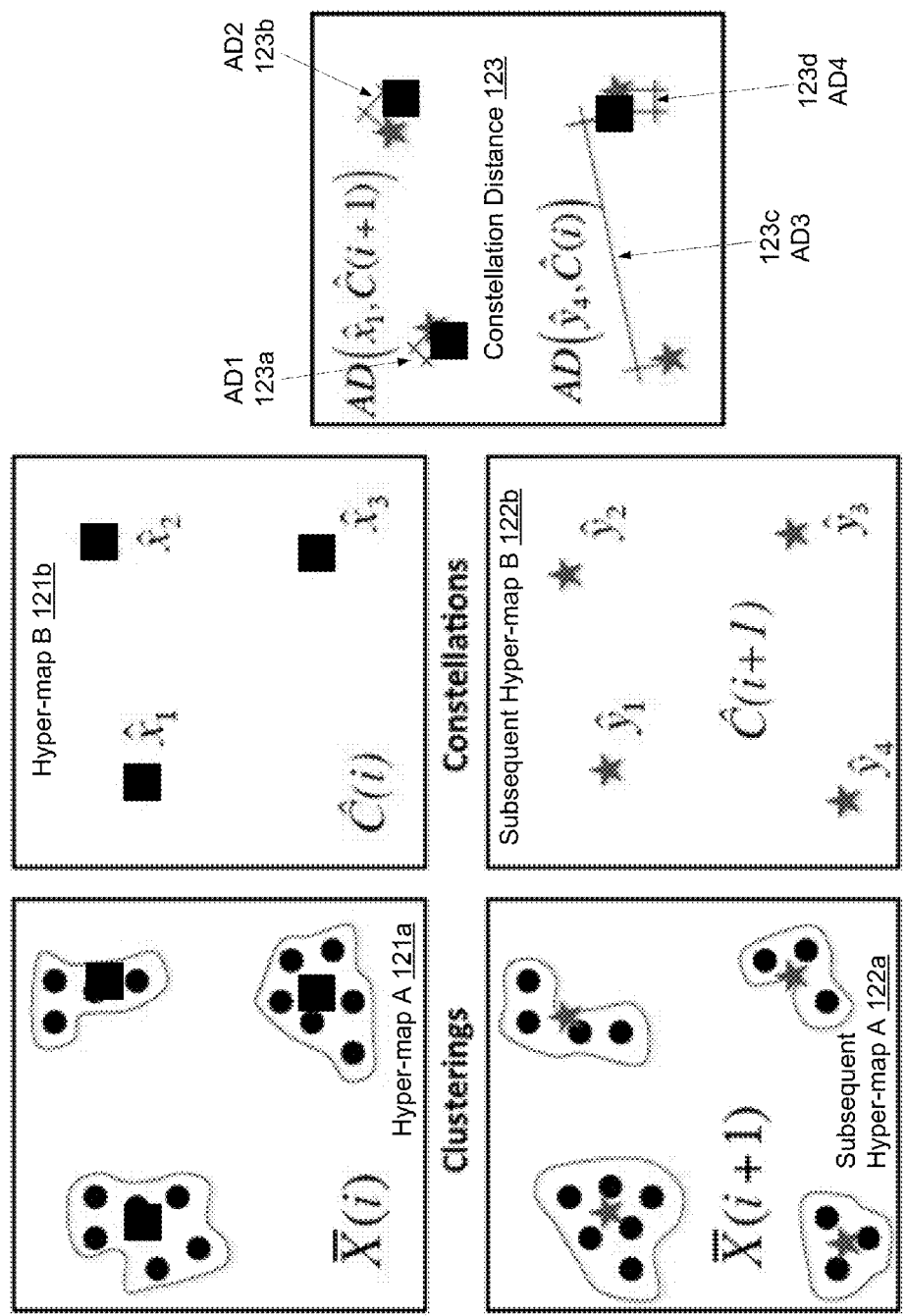

FIGS. 3A-3C show an example results in accordance with embodiments of the invention. As noted above, FIG. 3A shows an analysis tool YouLighter (103), which is an example of the CDN analysis tool (320) shown in FIG. 1, to automatically monitor and pinpoint changes in the YouTube® CDN. YouLighter is based on an unsupervised approach that, as such, does not require any knowledge on the YouTube® infrastructure. Instead, it only assumes the ISP has deployed passive probes, which expose TCP flow level logs summarizing videos requests from users. Considering a given observation window of, e.g., one day, these flow logs are aggregated to constitute snapshot of the traffic exchanged with YouTube® servers (referred to as caches throughout the description of FIGS. 3A-3C). Based on the DBScan clustering algorithm, a well-established unsupervised machine learning algorithm, YouLighter is able to automatically group thousands of caches into a much smaller number of clusters (referred to as edge-nodes throughout the description of FIGS. 3A-3C) using features that characterize the network distance of caches from the vantage point. The number of features characterizing each cache is referred to as the cardinality of the features. The features define a hyperspace where each dimension of the hyperspace correspond to one of the features. As soon as a new snapshot is available, it is transformed into a collection of points in the hyperspace where each point corresponds to a feature vector representing a cache of the content delivery network. The collection of points are clustered into multiple clusters where each cluster is summarized by a centroid of points in the cluster. In the context where each cluster's centroid in the hyperspace is analogous to a star in the Universe, the centroids of all clusters in the hyperspace are collectively referred to as a constellation. In this context, two constellations are compared using the notion of Constellation Distance. The bigger the distance, the more different are the caches used by YouTube® to serve ISP customers during the two different periods of time. YouLighter thus highlights changes in the edge-nodes used by YouTube® to serve ISPs' customers. But YouLighter can also pinpoint deviations from the typical behavior of the YouTube® edge-nodes, e.g., due to congestion arising in the network which makes the same edge-nodes look different. YouLighter has thus the potential to unveil sudden changes caused by the YouTube® CDN infrastructure, opening the opportunity to ISPs to take possible actions to mitigate the eventual problems. While YouLighter has been engineered to target YouTube® CDN monitoring, the Constellation Distance may also be applied to anomaly detection problems in general.

Returning to the discussion of FIG. 3A, the YouLighter (103) performs the following tasks in analyzing content delivery traffic flows to identify characteristics of the CDN:

Step 1—passive monitoring of YouTube® video flows: As described above, a passive probe provides the continuous collection of YouTube® traffic logs. Each TCP connection metadata is logged, and stored in a database for further processing.

Step 2—measurement consolidation and filtering: To ease the monitoring procedure, we use a batch processing approach that considers time windows of size $\Delta T$. Thus, every $\Delta T$ a snapshot is generated. In the following, the n-th snapshot is indicated as a superscript when needed, e.g., $a^{(n)}$ denotes the metric a at snapshot n and $X^{(n)}$ denotes the n-th snapshot. Each cache x is identified by its IP address. All flows in the same snapshot with the same server IP address are grouped to obtain a feature vector table where columns correspond to the measurements (e.g., RTT, TTL, transmitted packets, etc.), and each row corresponds to a feature vector, i.e., the tuple of measurement values observed within a TCP flow. Any flow group with less than a minimum number (e.g., 50) of feature vector is discarded.

Step 3—feature selection and data normalization: a feature selection driven by domain knowledge is applied to select the set M of measurements. In an example, M={RTT; TTL}. Then, for each cache x in the snapshot X, and for each measure m in M, a statistical distribution is generated. From the statistical distribution, the feature vector $P_m(x)=(p_{m,1}(x), p_{m,2}(x), \ldots, p_{m,k}(x))$ containing k percentiles of m for cache x. Percentiles are standardized following a simple normalization:

$$\min_m = \min(p_{m,i}(x) \forall x \in X, \forall i=1, \ldots, k) \quad (1)$$

$$\max_m = \max(p_{m,i}(x) \forall x \in X, \forall i=1, \ldots, k) \quad (2)$$

$$\bar{p}_{m,i}(x) = \frac{p_{m,i}(x) - \min_m}{\max_m - \min_m} \quad (3)$$

Eq. (3) normalizes the percentiles of measurement m so that $\bar{p}_{m,i} \in [0,1]$. At last, $\bar{P}_m(x)=(\bar{p}_{m,1}(x), \bar{p}_{m,2}(x), \ldots, \bar{p}_{m,k}(x))$ represents the standardized (i.e., normalized) vector of features for the measurement m for server x. Recalling that M={RTT; TTL}, each cache x in X is identified in a 2k-dimensional space by the standardized feature vector:

$$\bar{x}=(\bar{P}_{RTT}(x), \bar{P}_{TTL}(x)) \quad (4)$$

and the original set of caches X is transformed into a set of standardized feature vectors (or points in a hyperspace)

$$\bar{X}=\{\bar{x}\}.$$

Step 4—clustering: The density-based DBSCAN algorithm is used to group together the servers based on their multi-dimensional features. It has been chosen because it (i) is able to handle clusters of arbitrary shapes and sizes; (ii) is relatively resistant to noise and outliers; and (iii) does not require the specification of the number of desired clusters. DBSCAN requires two parameters: $\epsilon$ and the minimum number of points required to form a dense region minPts. Based on that, it classifies all points as being (i) core points, i.e., in the interior of a dense region; (ii) border points, i.e., on the edge of a dense region; or (iii) noise points, i.e., in a sparsely occupied region. Noise points are discarded, while any two core points that are within $\epsilon$ of each other are put in the same cluster. Similarly, any border point that is close enough to a core point is put in the same cluster as the core point. The result of this process is a collection C of clusters $C_j$, also referred to as a clustering:

$$C=\{C_j\}=\text{DBSCAN}(\overline{X}) \tag{5}$$

FIG. 3B shows a statistical diagram of feature vectors extracted from a snapshot (referred to as snapshot i) of network traffic flows captured from the CDN shown in FIG. 3A. The snapshot is an example of the snapshot A (330a) shown in FIG. 1 above. In particular, the snapshot includes flows associated with a large number of CDN servers. The flow group of each server has been analyzed to compile a percentile statistics of the RTT values. Accordingly, a feature vector (e.g., feature vector (111)) of each server is generated to include 5 elements, namely the RTT values at the 20th, 35th, 50th, 65th, and 90th percentiles in the percentile statistics of the server. The feature vectors of all servers are represented based on the feature vector legend (110) in the statistical diagram of FIG. 3B. The horizontal axis of the statistical diagram represents the servers (e.g., server (112)) and the vertical axis represents RTT values in each feature vector (e.g., feature vector (111) of the server (112)) of the servers. In particular, the servers are ordered along the horizontal axis by clustering their feature vectors. Specifically, the servers are clustered based on their feature vectors into five clusters, namely the feature vector cluster A (112a), feature vector cluster B (112b), feature vector cluster C (112c), feature vector cluster D (112d), and feature vector cluster E (112e). Although it may not be explicitly determined by the YouLighter (103), one or more of the feature vector cluster E-1 (112a), feature vector cluster E-2 (112b), feature vector cluster E-3 (112c), feature vector cluster E-4 (112d), and feature vector cluster E-5 (112e) correspond to one or more of the edge-node 1 (104a), edge-node 2 (104b), and edge-node 3 (104c) shown in FIG. 3A. For example, the feature vector cluster E-1 (112a), feature vector cluster E-2 (112b), and feature vector cluster E-3 (112c) may correspond to the edge-node 1 (104a), edge-node 2 (104b), and edge-node 3 (104c), respectively.

While each of the feature vectors is represented as a vertically placed sequence of five dots in the statistical diagram of FIG. 3B, alternatively each feature vector may also be represented as a point in a 5-dimensional hyperspace. The collection of points representing the feature vectors of all servers of the CDN form a hyper-map in this 5-dimensional hyperspace, such as the hyper-map A (121a) shown in FIG. 3C. Specifically in FIG. 3C, the hyper-map A (121a) is shown as a collection of points in a 2-dimensional projection of the 5-dimensional hyperspace. In particular, the hyper-map A (121a) is schematically represented by three groups of enclosed dots (i.e., points) representing the feature vector cluster E-1 (112a), feature vector cluster E-2 (112b), and feature vector cluster E-3 (112c) shown in FIG. 3B. The hyper-map A (121a) may be converted into the hyper-map B (121b) (referred to as a constellation map) by using geometric centers or centroids to represent the clusters. For example, the feature vector cluster E-1 (112a), feature vector cluster E-2 (112b), and feature vector cluster E-3 (112c) shown in FIG. 3B are represented by three solid blocks $\hat{x}_1$, $\hat{x}_2$, $\hat{x}_3$ in the hyper-map B (121b) that denote the three groups of enclosed dots in the hyper-map A (121a).

To track the evolution of a clustering (i.e., a collection of clusters) over time, two clusterings C(i) and C(i+1) are generated from two snapshots X(i) and X(i+1), one subsequent to another. In particular, X(i) and C(i) correspond to the hyper-map A (212a) and hyper-map (212b), respectively, shown in FIG. 3C. In addition, the subsequent hyper-map A (122a) and subsequent hyper-map B (122b) are evolved versions of the hyper-map A (212a) and hyper-map (212b), respectively, that correspond to a subsequent snapshot (referred to as snapshot i+1) of the network traffic flows captured from the CDN shown in FIG. 3A For instance, i) points that were present in C(i) may not be present in C(i+1), and vice versa; ii) points clustered into the same cluster in C(i) are now belong to two or more clusters in C(i+1); and iii) the same points that form a cluster in C(i) still form the same cluster, but are placed in another region in the hyperspace in C(i+1). In the context of a CDN, this corresponds to, e.g., i) popular caches at snapshot n that are not anymore being used at snapshot i+1, ii) some caches at snapshot i that were part of the noise are instead clustered at snapshot i+1, and iii) the path to caches suddenly changes at snapshot i+1, altering RTT. To evaluate the difference among the clusterings, the notion of Constellation Distance is used. The constellation, astral distance, and constellation distance are mathematically defined below.

1) Constellation: each cluster is mapped into a centroid that summarizes the cluster. Each centroid in the hyperspace is analogous to a star in the Universe. Given a cluster C, the centroid, or geometric center, $\hat{x}$ correspond to a feature vector's components $\hat{p}_{m,i}$:

$$\hat{p}_{m,i} = \frac{1}{|C|} \sum_{x \in C} \text{renorm}(p_{m,i}(x)) \tag{6}$$

All centroids of clusters then form a constellation $\hat{C}=\{\hat{x}\}$.

The renorm( ) function eventually considers the renormalization of features that can be needed if point in C(i) and C(i+1) went through different standardization processes. In the case of FIG. 3C, assuming $C(i)=C^{(n)}$; $C(i+1)=C^{(n+1)}$, from Eq. (3) for each m in M:

$$\text{Min}_m = \min(\min_m^{(n)}, \min_m^{(n+1)}) \tag{7}$$

$$\text{Max}_m = \max(\max_m^{(n)}, \max_m^{(n+1)}) \tag{8}$$

$$\text{renorm}_m(a) = \frac{a - \text{Min}_m}{\text{Max}_m - \text{Min}_m} \tag{9}$$

2) Astral Distance: Given a centroid $\hat{x}$ and a constellation $\hat{C}=\{\hat{x}\}$, the Astral Distance (AD) is defined as the distance between $\hat{x}$ and its closest neighbor $\hat{y}^* \in \hat{C}$ such that $d(\hat{x},\hat{y}^*) \leq d(\hat{x},\hat{y}) \forall \hat{y} \in \hat{C}$ where d(x; y) may be any distance metric that is valid in the feature hyperspace. For example, the classic Euclidean distance may be used:

$$AD(\hat{x}, \hat{C}) = \min_{\hat{y} \in \hat{C}} d(\hat{x}, \hat{y}) \quad (10)$$

3) Constellation Distance: Constellation Distance (CD) is defined as the total of the Astral Distances among every centroids in the clusterings. The constellation distance between the clusterings C(i) and C(i+1) is schematically represented as the Constellation Distance (123) shown in FIG. 3C. As shown in FIG. 3C, the three solid blocks $\hat{x}_1$, $\hat{x}_2$, $\hat{x}_3$ in the hyper-map B (121b) evolve into three solid stars $\hat{y}_1$, $\hat{y}_2$, $\hat{y}_3$ in the subsequent hyper-map B (122b) with emerging to represent a new server. Accordingly, the Constellation Distance (123) is illustrated by superposing the hyper-map B (121b) and the subsequent hyper-map B (122b) as shown in FIG. 3C. In other words, the Constellation Distance (123) includes the astral distances AD1 (123a), AD2 (123b), AD3 (123c), and AD4 (123d). Because the hyper-map B (121b) and the subsequent hyper-map B (122b) contain different number of centroids, the Constellation Distance (123) is mathematically computed as Eq. (11) below where (C(i), C(i+1)) are shown as ($\hat{C}1, \hat{C}2$).

$$CD(\hat{C}1, \hat{C}2) = \sum_{\hat{x} \in \hat{C}1} AD(\hat{x}, \hat{C}2) + \sum_{\hat{x} \in \hat{C}2} AD(\hat{x}, \hat{C}1) \quad (11)$$

Although the example shown in FIGS. 3B and 3C is based on 5 pre-determined percentiles of the timing attribute RTT, the example may be varied to include different number (more than 5 or less than 5) of pre-determined percentiles of the timing attribute RTT. Further, the example may also be varied to include alternative timing attribute other than RTT, such as TTL or a combination of multiple timing attributes, such as (TTL, RTL), etc.

Figure 4:
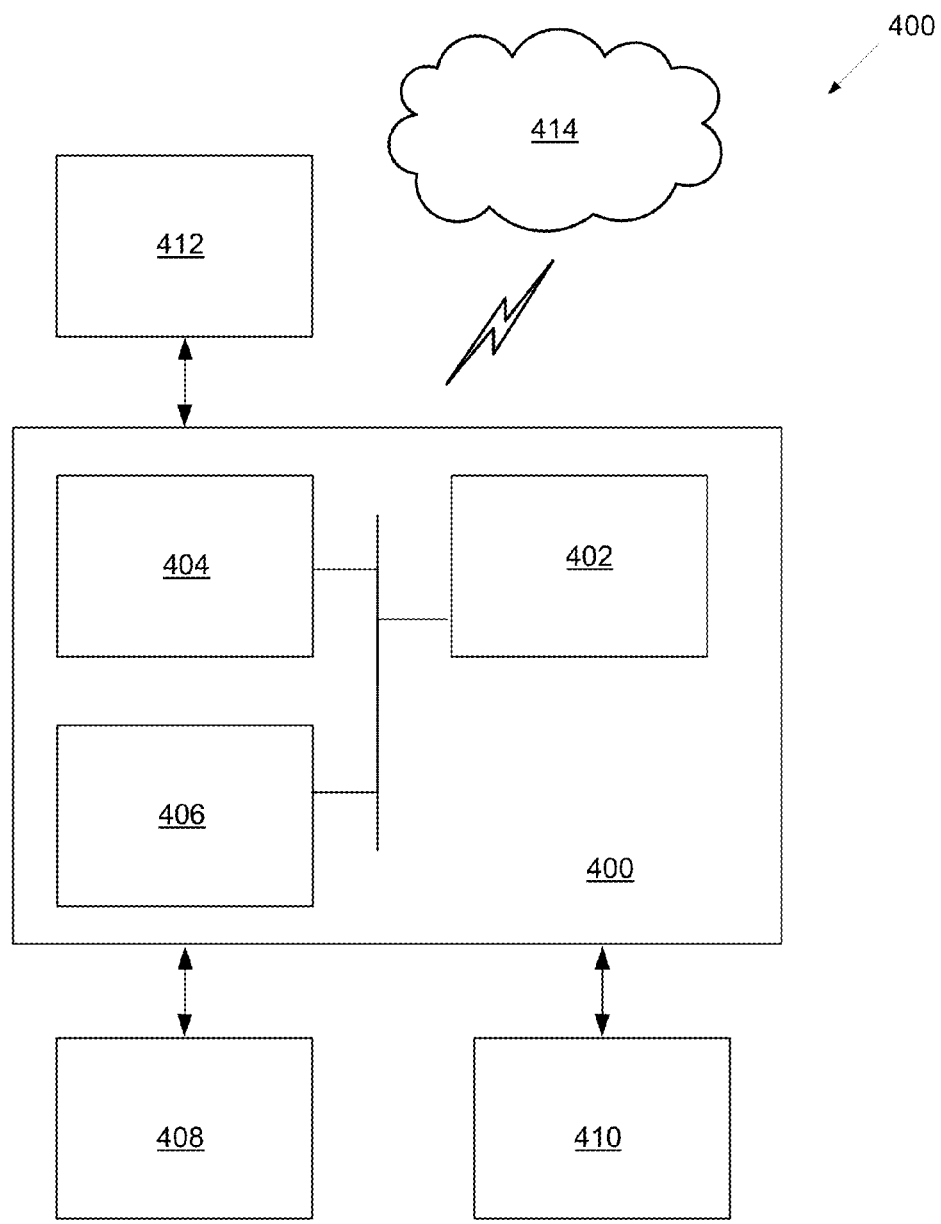
FIG. 4 shows a computer system according to aspects of the invention.

Embodiments of the invention may be implemented on virtually any type of computer regardless of the platform being used. For example, as shown in FIG. 4, a computer system (400) includes one or more processor(s) (402), associated memory (404) (e.g., random document access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer (400) may also include input means, such as a keyboard (408), a mouse (410), or a microphone (not shown). Further, the computer (400) may include output means, such as a monitor (412) (e.g., a liquid crystal display (LCD), a plasma display, or cathode ray tube (CRT) monitor) for example to display various results such as the feature vectors, the principal components, the application space, the signatures, etc. The computer system (400) may be connected to a network (414) (e.g., a local area network (LAN), a wide area network (WAN) such as the Internet, or any other similar type of network) with wired and/or wireless segments via a network interface connection (not shown). Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Further, those skilled in the art will appreciate that one or more elements of the aforementioned computer system (400) may be located at a remote location and connected to the other elements over a network. Further, embodiments of the invention may be implemented on a distributed system having a plurality of nodes, where each portion of the invention (e.g., various modules of FIG. 1) may be located on a different node within the distributed system. In one embodiments of the invention, the node corresponds to a computer system. Alternatively, the node may correspond to a processor with associated physical memory. The node may alternatively correspond to a processor with shared memory and/or resources. Further, software instructions for performing embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments may be devised which do not depart from the scope of the invention as disclosed herein. Accordingly, the scope of the invention should be limited only by the attached claims.

What is claimed is:

1. A method for analyzing a content delivery network, comprising:
    obtaining a plurality of network traffic flows corresponding to a plurality of user nodes accessing contents from a plurality of servers of the content delivery network, wherein the content delivery network comprises a plurality of server groups each comprising a portion of the plurality of servers;
    extracting, by a computer processor and from the plurality of network traffic flows, a timing attribute from each network traffic flow associated with a server of the plurality of servers, wherein the timing attribute is aggregated into a timing attribute dataset of the server based on all network traffic flows associated with the server in the plurality of network traffic flows;
    generating, by the computer processor and based on a pre-determined statistical algorithm, a statistical measure of the timing attribute dataset as a portion of a feature vector representing the server, wherein the feature vector is aggregated into a plurality of feature vectors representing the plurality of servers;
    analyzing, by the computer processor and based on a pre-determined clustering algorithm, the plurality of feature vectors to generate a plurality of clusters; and
    generating, based on the plurality of clusters, a representation of the plurality of server groups.

2. The method of claim 1,
    wherein the timing attribute comprises at least one selected from a group consisting of a round trip time delay (RTT) parameter and a time to live (TLL) parameter.

3. The method of claim 1, wherein generating the statistical measure of the timing attribute dataset comprises:
    generating a statistical distribution of the timing attribute dataset,
    wherein the statistical measure of the timing attribute dataset comprises a value of the timing attribute corresponding to one of a plurality of pre-determined percentiles of the statistical distribution.

4. The method of claim 3,
    wherein the feature vector comprises a plurality of values of the timing attribute corresponding to the plurality of pre-determined percentiles of the statistical distribution, and wherein the plurality of feature vectors represent a characteristics of allocating the plurality of user nodes to the plurality of servers in the content delivery network.

5. The method of claim 1, wherein generating the representation of the plurality of server groups comprises:
generating a hyperspace to represent characteristics of the content delivery network, wherein a cardinality of the hyperspace is based on the cardinality of the plurality of feature vectors;
determining, for each of the plurality of clusters, a point in the hyperspace to represent a corresponding cluster among the plurality of clusters; and
representing the plurality of server groups in the hyperspace by a plurality of points comprising the point.

6. The method of claim 5, further comprising:
identifying a time window within which the plurality of network traffic flows are active, wherein the plurality of points form a hyper-map in the hyperspace representing the plurality of the server groups for the time window;
obtaining a subsequent plurality of network traffic flows that are active during a subsequent time window that is subsequent to the time window;
determining, based on the pre-determined statistical algorithm and the pre-determined clustering algorithm, a subsequent plurality of points to form a subsequent hyper-map in the hyperspace representing the plurality of the server groups for the subsequent time window;
computing a hyper-distance to represent a difference between the hyper-map and the subsequent hyper-map; and
detecting, based on the hyper-distance, a change in the content delivery network.

7. The method of claim 1,
wherein each of the plurality of the server groups corresponds to a server facility of the content delivery network.

8. A system for analyzing a content delivery network, comprising:
a processor and memory;
an acquisition module comprising instructions stored in the memory, when executed on the processor having functionality to:
obtain a plurality of network traffic flows corresponding to a plurality of user nodes accessing contents from a plurality of servers of the content delivery network, wherein the content delivery network comprises a plurality of server groups each comprising a portion of the plurality of servers;
a feature extractor comprising instructions stored in the memory, when executed on the processor having functionality to:
extract, from the plurality of network traffic flows, a timing attribute from each network traffic flow associated with a server of the plurality of servers, wherein the timing attribute is aggregated into a timing attribute dataset of the server based on all network traffic flows associated with the server in the plurality of network traffic flows; and
generate, based on a pre-determined statistical algorithm, a statistical measure of the timing attribute dataset as a portion of a feature vector representing the server, wherein the feature vector is aggregated into a plurality of feature vectors representing the plurality of servers;
a feature space analyzer comprising instructions stored in the memory, when executed on the processor having functionality to:
analyze, based on a pre-determined clustering algorithm, the plurality of feature vectors to generate a plurality of clusters; and
generate, based on the plurality of clusters, a representation of the plurality of server groups; and
a repository for storing the plurality of feature vectors and the plurality of clusters.

9. The system of claim 8,
wherein the timing attribute comprises at least one selected from a group consisting of a round trip time delay (RTT) parameter and a time to live (TLL) parameter.

10. The system of claim 8, wherein generating the statistical measure of the timing attribute dataset comprises:
generating a statistical distribution of the timing attribute dataset,
wherein the statistical measure of the timing attribute dataset comprises a value of the tuning attribute corresponding to one of a plurality of pre-determined percentiles of the statistical distribution.

11. The system of claim 10,
wherein the feature vector comprises a plurality of values of the timing attribute corresponding to the plurality of pre-determined percentiles of the statistical distribution, and
wherein the plurality of feature vectors represent a characteristics of allocating the plurality of user nodes to the plurality of servers in the content delivery network.

12. The system of claim 8, wherein generating the representation of the plurality of server groups comprises:
generating a hyperspace to represent characteristics of the content delivery network, wherein a cardinality of the hyperspace is based on the cardinality of the plurality of feature vectors;
determining, for each of the plurality of clusters, a point in the hyperspace to represent a corresponding cluster among the plurality of clusters; and
representing the plurality of server groups in the hyperspace by a plurality of points comprising the point.

13. The system of claim 12, wherein the instructions stored in the memory, when executed on the processor further having functionality to:
identify a time window within which the plurality of network traffic flows are active, wherein the plurality of points form a hyper-map in the hyperspace representing the plurality of the server groups for the time window;
obtain a subsequent plurality of network traffic flows that are active during a subsequent time window that is subsequent to the time window;
determine, based on the pre-determined statistical algorithm and the pre-determined clustering algorithm, a subsequent plurality of points to form a subsequent hyper-map in the hyperspace representing the plurality of the server groups for the subsequent time window;
compute a hyper-distance to represent a difference between the hyper-map and the subsequent hyper-map; and
detect, based on the hyper-distance, a change in the content delivery network.

14. The system of claim 8,
wherein each of the plurality of the server groups corresponds to a server facility of the content delivery network.

15. A non-transitory computer readable medium embodying instructions for analyzing a content delivery network, the instructions when executed by a processor comprising functionality for:

obtaining a plurality of network traffic flows corresponding to a plurality of user nodes accessing contents from a plurality of servers of the content delivery network, wherein the content delivery network comprises a plurality of server groups each comprising a portion of the plurality of servers;

extracting, from the plurality of network traffic flows, a timing attribute from each network traffic flow associated with a server of the plurality of servers, wherein the tinning attribute is aggregated into a tinning attribute dataset of the server based on all network traffic flows associated with the server in the plurality of network traffic flows;

generating, based on a pre-determined statistical algorithm, a statistical measure of the timing attribute dataset as a portion of a feature vector representing the server, wherein the feature vector is aggregated into a plurality of feature vectors representing the plurality of servers;

analyzing, based on a pre-determined clustering algorithm, the plurality of feature vectors to generate a plurality of clusters; and generating, based on the plurality of clusters, a representation of the plurality of server groups.

16. The non-transitory computer readable medium of claim 15, wherein the timing attribute comprises at least one selected from a group consisting of a round trip time delay (RTT) parameter and a time to live (TLL) parameter.

17. The non-transitory computer readable medium of claim 15, wherein generating the statistical measure of the timing attribute dataset comprises:

generating a statistical distribution of the timing attribute dataset, wherein the statistical measure of the timing attribute dataset comprises a value of the timing attribute corresponding to one of a plurality of pre-determined percentiles of the statistical distribution.

18. The non-transitory computer readable medium of claim 17, wherein the feature vector comprises a plurality of values of the timing attribute corresponding to the plurality of pre-determined percentiles of the statistical distribution, and wherein the plurality of feature vectors represent a characteristics of allocating the plurality of user nodes to the plurality of servers in the content delivery network.

19. The non-transitory computer readable medium of claim 15, wherein generating the representation of the plurality of server groups comprises:

generating a hyperspace to represent characteristics of the content delivery network, wherein a cardinality of the hyperspace is based on the cardinality of the plurality of feature vectors;

determining, for each of the plurality of clusters, a point in the hyperspace to represent a corresponding cluster among the plurality of clusters; and representing the plurality of server groups in the hyperspace by a plurality of points comprising the point, wherein each of the plurality of the server groups corresponds to a server facility of the content delivery network.

20. The non-transitory computer readable medium of claim 19, the instructions when executed by the processor further comprising functionality for:

identifying a time window within which the plurality of network traffic flows are active, wherein the plurality of points form a hyper-map in the hyperspace representing the plurality of the server groups for the time window;

obtaining a subsequent plurality of network traffic flows that are active during a subsequent time window that is subsequent to the time window;

determining, based on the pre-determined statistical algorithm and the pre-determined clustering algorithm, a subsequent plurality of points to form a subsequent hyper-map in the hyperspace representing the plurality of the server groups for the subsequent time window;

computing a hyper-distance to represent a difference between the hyper-map and the subsequent hyper-map; and detecting, based on the hyper-distance, a change in the content delivery network.

\* \* \* \* \*